United States Patent [19]
Bedard

[11] Patent Number: 5,935,552
[45] Date of Patent: Aug. 10, 1999

[54] CRYSTALLINE INTERGROWTH MOLECULAR SIEVES

[75] Inventor: Robert L. Bedard, McHenry, Ill.

[73] Assignee: UOP LLC, Des Plaines, Ill.

[21] Appl. No.: 09/059,737

[22] Filed: Apr. 15, 1998

Related U.S. Application Data

[63] Continuation-in-part of application No. 08/708,283, Sep. 6, 1996, Pat. No. 5,858,243, which is a continuation-in-part of application No. 08/439,454, May 11, 1995, abandoned.

[51] Int. Cl.$^6$ .................................................. C01B 37/00
[52] U.S. Cl. .......................... 423/700; 423/713; 423/326
[58] Field of Search ............................... 423/62, 87, 326, 423/331, 332, 700, 713, 718

[56] References Cited

U.S. PATENT DOCUMENTS

| | | | |
|---|---|---|---|
| 3,012,853 | 12/1961 | Milton | 423/718 |
| 3,329,481 | 7/1967 | Young | 423/333 |
| 3,622,268 | 11/1971 | Wada et al. | 423/24 |
| 4,853,202 | 8/1989 | Kuznicki | 423/326 |
| 4,938,938 | 7/1990 | Kuznicki | 423/326 |
| 5,013,536 | 5/1991 | Vaughan et al. | 423/718 |
| 5,015,453 | 5/1991 | Chapman | 423/718 |
| 5,518,707 | 5/1996 | Bedard et al. | 423/713 |

FOREIGN PATENT DOCUMENTS

| | | |
|---|---|---|
| 94/19277 | 9/1994 | WIPO . |

OTHER PUBLICATIONS

Chapman et al., "Sythesis, Characterization and Crystal Chemistry of Microporous Titanium Silicate Materials," ZEOLITES, vol. 10, p. 730, Nov. 1990.

Nenoff et al., "[Na3Hx(H2P04)x[(Ge0)4(Ge04)3]4H2O: a Rhombohedrally Distorted Germanium Pharmacosiderite Analog wiith Anion/Cation Exchange Properties," CHEM. MATER., vol. 6, pp. 525–530., 1994.

Harrison et al., "Single Crystal Structure of Cs3HTi404(Si04)3–4H2O, a Titanosilicate Pharmacosiderite Analog," ZEOLITES, vol. 15, pp. 408–412, 1995.

Sandomirskii and Belov, in *Sov. Phys. Crystallogr.*, 24 (6) Nov.–Dec., pp. 686–693.

Sokolova et al. in *Sov. Phys. Dolk.*, 34 (7), Jul. 1989, pp. 593–585.

Menshikov et al. in *Zap, Vseross Mineral O–va*, 121 (1), 1992, pp. 94–99. (No Month)

Poojary, Cahill and Clearfield in *Chem. Mater.*, 6, 1994, pp. 2364–2368. (No Month).

*Primary Examiner*—Mark L. Bell
*Assistant Examiner*—David Sample
*Attorney, Agent, or Firm*—Thomas K. McBride; Frank S. Molinaro

[57] ABSTRACT

A novel molecular sieve is disclosed which has a crystal structure which is an intergrowth of the pharmacosiderite and sitinakite structures. The molecular sieve has an empirical formula of:

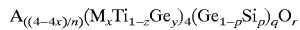

$$A_{((4-4x)/n)}(M_xTi_{1-z}Ge_y)_4(Ge_{1-p}Si_p)_qO_r$$

where A is a cation such as sodium or potassium and M is a metal such as niobium or tantalum. A process for preparing the molecular sieve is also disclosed.

11 Claims, 4 Drawing Sheets

CRYSTALLINE INTERGROWTH MOLECULAR SIEVES

CROSS REFERENCE TO RELATED APPLICATIONS

This application is a Continuation-in-part of prior U.S. application Ser. No. 08/708,283 filed on Sep. 6, 1996, now U.S. Pat. No. 5,858,243, which in turn is a continuation-in-part of prior U.S. application Ser. No. 08/439,454 filed May 11, 1995 now abandoned.

FIELD OF THE INVENTION

This invention relates to a novel molecular sieve which has a crystal structure which is an intergrowth of the pharmacosiderite and sitinakite structures and a process for preparing the molecular sieve.

BACKGROUND OF THE INVENTION

Zeolites are crystalline aluminosilicate molecular sieves which have a microporous three-dimensional framework structure. In general, the crystalline zeolites are formed from corner-sharing $AlO_2$ and $SiO_2$ tetrahedra and are characterized by having pore openings of uniform dimensions, having a significant, ion-exchange capacity and being capable of reversibly desorbing an adsorbed phase which is dispersed throughout the internal voids of the crystal without significantly displacing any atoms which make up the permanent crystal structure.

Zeolites can be represented on an anhydrous basis, by the empirical formula $$M_{2/n}O:Al_2O_3:XSiO_2$$

where M is a cation having the valence n, X is generally equal to or greater than 2. In naturally occurring zeolites, M can be Li, Na, Ca, K, Mg and Ba. The M cations are loosely bound to the structure and frequently can be completely or partially replaced with other cations by conventional ion exchange techniques. Currently over 150 species of both naturally occurring and synthetic zeolites are known.

Other crystalline microporous compositions are known which are not zeolitic, i.e., do not contain $AlO_2$ and $SiO_2$ tetrahedra as essential framework constituents, but which exhibit the ion-exchange and/or adsorption characteristics of the zeolites. One such group of microporous compositions, i.e., molecular sieves, contain titanium and silicon as the framework elements. For example, U.S. Pat. No. 3,329,481 discloses a crystalline titano-silicate molecular sieve having the x-ray diffraction pattern of pharmacosiderite. U.S. Pat. No. 4,853,202 discloses a titano-silicate molecular sieve having large pores, while U.S. Pat. No. 4,938,939 discloses a small pore titano-silicate molecular sieve. Sandomirskii and Belov, in *Sov. Phys. Crystallogr.*, 24(6), Nov.–Dec. 1979, pp. 686–693 report on the structure of an alkali titanosilicate known as zorite. Sokolova et al. in *Sov. Phys. Dokl.*, 34(7), July 1989, pp. 583–585 disclose the structure of a natural sodium titanosilicate. This mineral has a unique structure related in only one crystallographic direction to the pharmacosiderite structure, with unique structural features in the other two principal crystallographic directions. This new mineral was designated SiTiNaKite by the geologist who originally discovered it in *Zap. Vseross Mineral O-va*, 121(1), 1992, pp. 94–99. More recently, Poojary, Cahill and Clearfield reported the preparation and structural characterization of a porous titanosilicate with the sitinakite structure in *Chem. Mater.*, 6, 1994, pp. 2364–2368.

One property of these molecular sieves is that they can undergo cation exchange. For example, the alkali metal cations present in these molecular sieves can be exchanged for other metals such as cesium, strontium, mercury, and silver cations. Owing to this property, these molecular sieves can be used to remove various metals from waste streams or may find utility in hydrometallurgical separations of technologically important or precious metals. The effectiveness of any one molecular sieve is determined primarily by its ring or channel diameter, framework charge density and dimensionality of the intracrystalline pores. In particular, the pharmacosiderite structure has a three-dimensional pore structure which offers facile diffusion of cations such as sodium, potassium, strontium, mercury and silver, although the structures' selectivity for certain cations is inferior to that of sitinakite. The sitinakite structure has a one-dimensional pore system which has been shown to display high selectivity for cations such as strontium and cesium but which potentially displays diffusion kinetic limitations due to the low dimensionality of its channel system.

Applicant has synthesized molecular sieves which have a structure which is an intergrowth of the pharmacosiderite and the sitinakite structures. What this means is that these novel molecular sieves display the beneficial ion exchange characteristics of both the pharmacosiderite and sitinakite structures. The molecular sieves of this invention have an empirical formula of $$A_{((4-4x)/n)}(M_xTi_{1-z}Ge_y)_4(Ge_{1-p}Si_p)_qO_r$$

where A is an exchangeable cation selected from the group consisting of alkali metals, alkaline earth metals, hydronium ion, ammonium ions, alkylammonium ions having $C_1$ or $C_2$ alkyl groups and mixtures thereof, n is the valence of A and has a value of +1 or +2, M is a metal selected from the group consisting of niobium, tantalum, antimony or mixtures thereof, x has a value from about 0.01 to about 0.99, z=x+y, y has a value from 0 to 0.75, p has a value from 0 to about 1, q has a value from about 2.01 to about 2.99 and r has a value from about 14.02 to about 15.98.

It has been found that these novel molecular sieves have good ion exchange properties, especially for cesium ions.

SUMMARY OF THE INVENTION

As stated, this invention relates to novel molecular sieves and a process for preparing them. Accordingly, one embodiment of the invention is a crystalline molecular sieve having a chemical composition represented by the empirical formula:

$$A_{((4-4x)/n)}(M_xTi_{1-z}Ge_y)_4(Ge_{1-p}Si_p)_qO_r$$

where A is an exchangeable cation selected from the group consisting of alkali metals, alkaline earth metals, hydronium ion, ammonium ions, alkylammonium ions having $C_1$ or $C_2$ alkyl groups, and mixtures thereof, n is the valence of A and has a value of +1 or +2, M is a metal selected from the group consisting of niobium, tantalum, antimony or mixtures thereof, x has a value from about 0.01 to about 0.99, z=x+y, y has a value from 0 to 0.75, p has a value from 0 to about 1, q has a value from about 2.01 to about 2.99 and r has a value from about 14.02 to about 15.98, the sieve characterized in that it has a crystal structure which is an intergrowth of the pharmacosiderite and sitinakite structures.

Another embodiment of the invention is a process for preparing the above molecular sieve, the process comprising reacting a mixture containing reactive sources of A, M, titanium, germanium and silicon at a temperature and for a time sufficient to form the crystalline molecular sieve, the mixture having a composition expressed in terms of mole ratios of the oxides of:

$$aA_{2/n}O:bM_2O_5:cGeO_2:dTiO_2:eSiO_2:fH_2O$$

where a has a value from about 0.5 to about 4, n is the valence of A, b has a value from about 0.05 to about 1.0, c has a value from about 0 to about 0.8, d has a value from about 0.25 to about 1.0, e has a value from about 0.2 to about 1.3, and f has a value from about 25 to about 300.

These and other objects and embodiments of the invention will become more apparent after a more detailed description of the invention.

DETAILED DESCRIPTION OF THE INVENTION

One embodiment of the present invention is a novel molecular sieve which is an intergrowth of the pharmacosiderite and sitinakite structures. The molecular sieve of this invention is represented by the empirical formula:

$$A_{((4-4x)/n)}(M_xTi_{1-z}Ge_y)_4(Ge_{1-p}Si_p)_qO_r$$

where A is an exchangeable cation having a valence of n where n is +1 or +2 and A is selected from the group consisting of alkali metals, alkaline earth metals, hydronium ions, ammonium ions, alkylammonium ions having $C_1$ or $C_2$ alkyl groups, and mixtures thereof. The alkali metals include sodium, potassium, rubidium, lithium, and cesium, the alkaline earth metals include magnesium, calcium, strontium and barium, while the alkylammonium cations include tetramethylammonium cations and the protonated forms of ethylenediamine and methylamine. A mixture of sodium and potassium is preferred. M is a metal selected from the group consisting of niobium, tantalum, antimony and mixtures thereof. The other variables have the following values: x has a value from about 0.01 to about 0.99; z=x+y, y has a value from 0 to 0.75, p has a value from 0 to about 1; q has a value from about 2.01 to about 2.99 and r has a value from about 14.02 to about 15.98.

Figure 1:
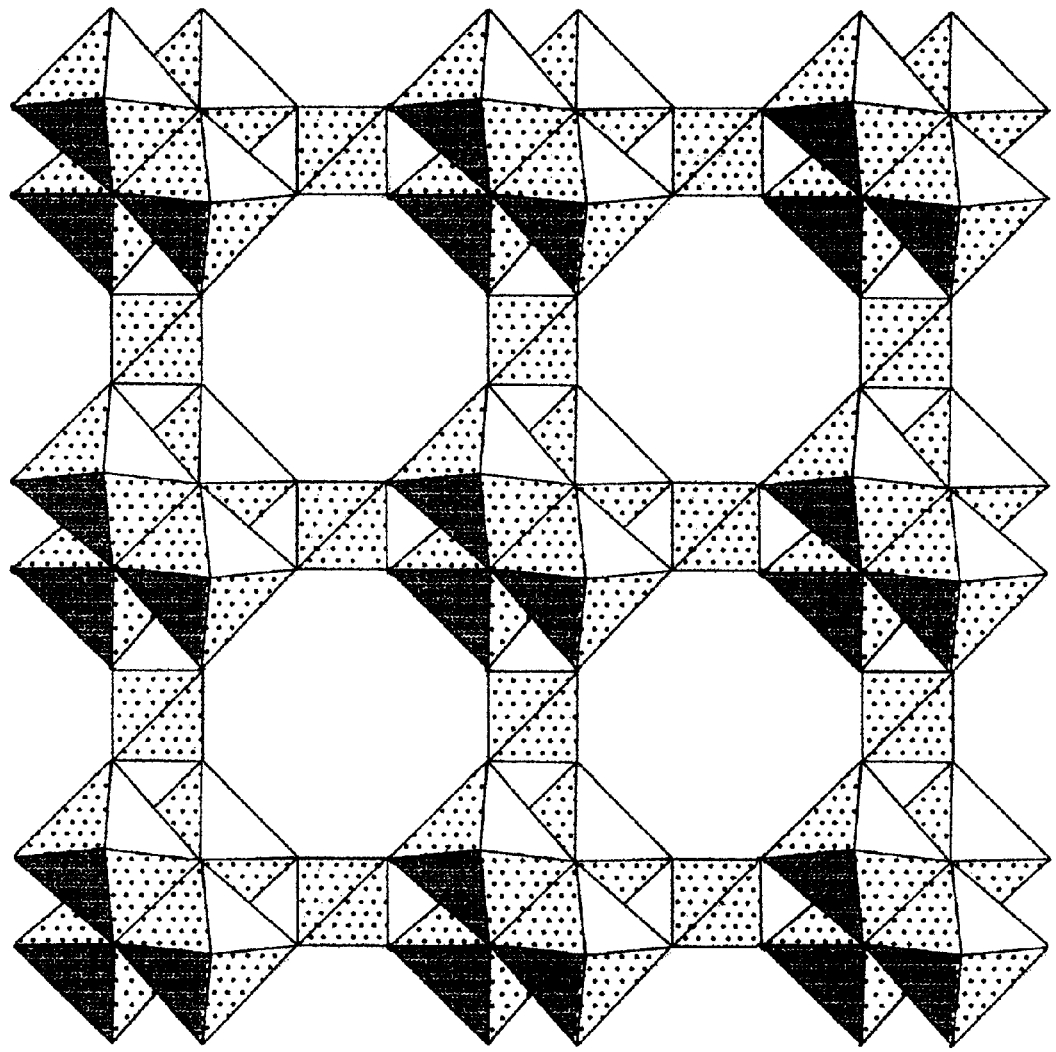
FIG. 1 is a polyhedral drawing of the A–B plane of the pharmacosiderite and the sitinakite structure.
Figure 2:
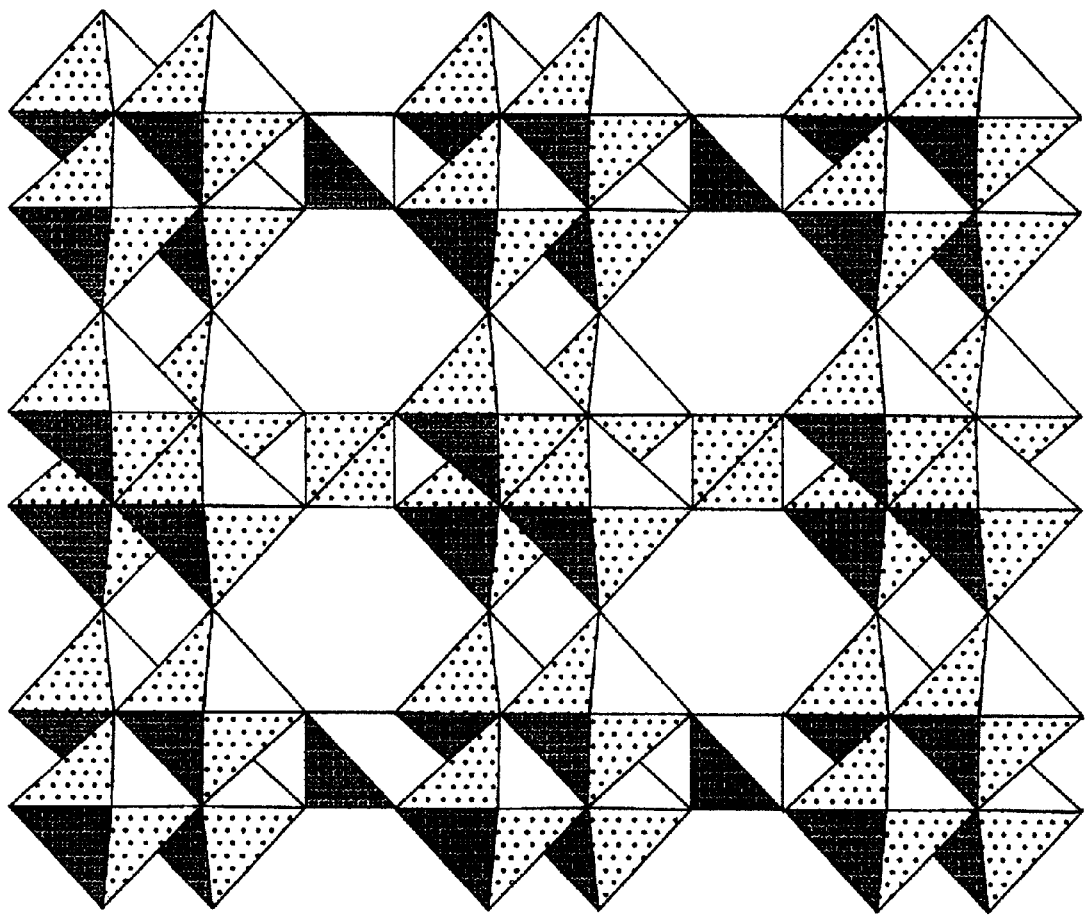
FIG. 2 is a polyhedral drawing of the B–C plane of sitinakite.
Figure 3:
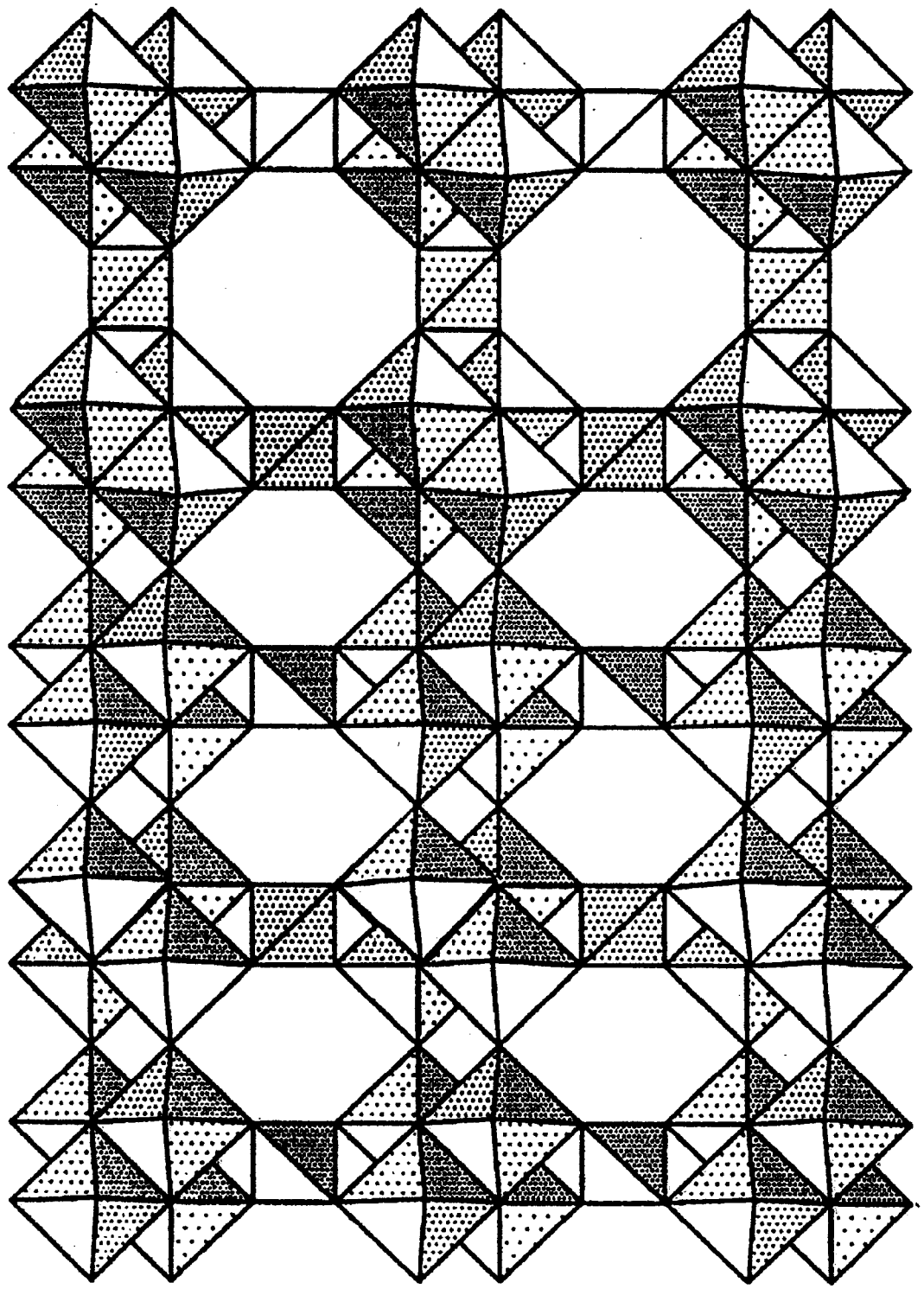
FIG. 3 is a polyhedral drawing of the B–C plane of a pharmacosiderite/sitinakite intergrowth.

The molecular sieves of the present invention are intergrowths of the pharmacosiderite and sitinakite structures. By intergrowth is meant that both structures are present in a major portion of the crystals in a given sample. This intergrowth of structures is possible when the two structures have nearly identical spacial arrangements of atoms along certain directions of their crystal structure. FIG. 1 shows a polyhedral drawing of the A–B plane (which is equivalent to the B–C and A–C planes because of the cubic structure) of pharmacosiderite, as well as the A–B plane of the sitinakite structure. FIG. 2 shows a polyhedral drawing of the B–C plane (which is equivalent to the A–C plane because of the tetragonal structure) of sitinakite. It can be seen from these drawings that the A–B plane of sitinakite is identical to that of pharmacosiderite, thereby allowing the two structures to intergrow with interfaces at the compatible A–B planes, as shown in FIG. 3.

An intergrowth is not a physical mixture of the two molecular sieves. Electron diffraction, transmission electron microscopy and x-ray diffraction analysis are employed to show that a material is an intergrowth instead of a physical mixture. Usually lattice image data of the crystals is most definitive in determining whether one has produced an intergrowth because it provides direct visual evidence of the existence of both structures within one crystal.

Figure 4:
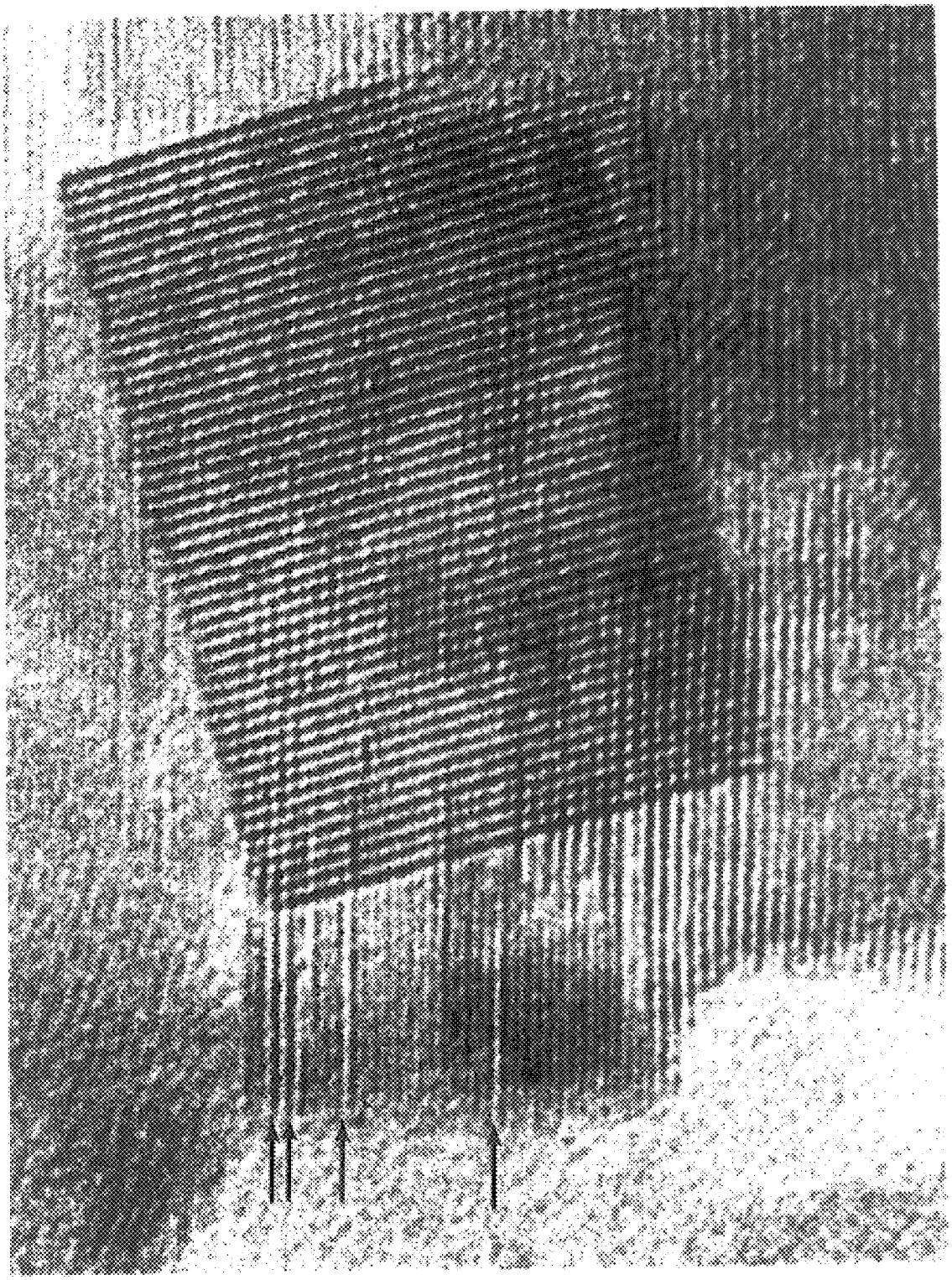
FIG. 4 is a lattice image photograph obtained by Transmission Electron Microscopy.

Intergrowth of the two structures can be seen within individual crystals by imaging the crystals in a direction perpendicular to the intergrowth vector, which corresponds to the C-direction of the tetragonal unit cell of the sitinakite structure and the <100> direction of the isotropic pharmacosiderite structure. The intergrowths are indicated by the appearance of bands of different thicknesses. Bands of 5.9±0.2 Å, corresponding to sections of the sitinakite structure, are interspersed with bands of 7.8±0.2 Å, corresponding to sections of the pharmacosiderite structure in the lattice images. FIG. 4 shows the lattice image of an intergrowth sample prepared in Example 1. Sections of pharmacosiderite that are present in the intergrowth structure are indicated with arrows. The thinner sections making up the balance of the crystal in the image correspond to blocks of the sitinakite structure.

The x-ray diffraction patterns of these intergrowths contain at least one peak at a d-spacing between 7 Å and 8 Å with a relative intensity of 100. More specifically, the x-ray powder diffraction patterns display a combination of sharp and broad peaks. The sharp diffraction peaks primarily coincide with the hk0 index reflections that are common to the two end member structures while most of the diffraction peaks that would have indexed as hkl in sitinakite when l is a non-zero integer are broad or absent in the intergrowths.

Since the intergrowth sieves of this invention can have varying amounts of the two separate components, it is to be understood that the relative intensity and line width of some of the diffraction lines will vary depending on the amount of each structure present in the intergrowth. Although the degree of variation in the x-ray powder diffraction patterns is theoretically predictable for specific intergrown structures, the more likely mode of intergrowth is random in nature and therefore difficult to predict without the use of large hypothetical models as bases for calculation. Qualitatively, most of the variations in the x-ray patterns can be predicted to be in those reflections which contain contributions from the intergrowth vector direction, or the hkl reflections with non-zero l values.

The intergrowth molecular sieves are prepared by hydrothermal crystallization of a reaction mixture containing reactive sources of the desired elements and water. For the A cation, the reactive sources include potassium hydroxide, sodium hydroxide, cesium hydroxide, rubidium hydroxide, sodium carbonate, potassium carbonate, cesium carbonate, rubidium carbonate, barium hydroxide, barium carbonate, tetramethylammonium hydroxide, ethylenediamine, methylamine and ammonium hydroxide. When A is an amine it becomes protonated during the mixing of the reaction mixture. Specific examples of the reactive sources of germanium are germanium oxide, germanium tetrachloride and germanium alkoxides, e.g., germanium ethoxide and germanium isopropoxide. Specific examples of M sources are niobium pentaoxide hydrate, tantalum ethoxide, antimony trichloride, niobium oxalate, niobium ethoxide, freshly precipitated hydrated niobium oxide. Sources of titanium include titanium trichloride, titanium tetrachloride, titanium tetraethoxide and amorphous titanium oxide. Finally, examples of reactive sources of silicon include sodium silicate, fumed silica, precipitated silica and silicon tetrachloride.

Generally, the hydrothermal process used to prepare the intergrowth molecular sieves of this invention involves forming a reaction mixture which is expressed by the formula in terms of mole ratios of the oxides of:

where a has a value from about 0.5 to about 4, n is the valence of A, b has a value from about 0.05 to about 1.0, c has a value from 0 to about 0.8, d has a value from about 0.25 to about 1.0, e has a value from about 0.2 to about 1.3, and f has a value from about 25 to about 300.

The pH of the mixture needs to be adjusted to a value of about 8 to about 14 and preferably from about 10 to about 13. The pH can be adjusted by adding an hydroxide such as sodium hydroxide, potassium hydroxide, cesium hydroxide, or tetramethylammonium hydroxide.

Having formed the reaction mixture, it is next reacted at a temperature of about 130° C. to about 225° C. for a period of time of about 4 to about 336 hours. The reaction is carried out under atmospheric pressure or the reaction vessel may be sealed and the reaction run at autogenous pressure. Preferably the reaction is run at a temperature of about 150° C. to about 200° C. and a time of about 24 to about 168 hours.

One function of the A cation is to act as a structure directing agent. Since the A cation acts as a structure directing agent, a portion of the A cation will be present in the pores of the molecular sieve. These A cations can be exchanged for other cations using ion exchange methods well known in the art. For example, when A is an alkali metal it can be exchanged with ammonium ions to give the ammonium form of the molecular sieve.

Due to their approximately 4 Å pore size, the crystalline materials of this invention are capable of separating water and other small molecules from larger molecular species and can thus be used as desiccants, gas drying agents, as well as in separations of ammonia and hydrogen from gas streams.

The crystalline materials of this invention are also capable of selective ion exchange of various contaminant metals from liquid streams such as aqueous streams thereby removing these metals from the liquid streams. Illustrative of the contaminant metals which can be removed from liquid stream are cesium, strontium, mercury and silver. These metals can be removed from the liquid stream by contacting the stream with the molecular sieve for a time sufficient to remove the metal and trap it in the molecular sieve. The contacting can be carried out either in a batch mode or in a continuous mode. In a batch mode, the desired molecular sieve is placed in an appropriate container and the stream to be treated mixed therewith. Contacting is carried out for a time of about 0.1 to about 100 hr. In a continuous mode, the molecular sieve is placed in a column and the stream to be treated is flowed through it, usually downflow, until the contaminant metal is detected in the effluent of the column. The metal containing molecular sieve can either be disposed of or it can be regenerated by eluting with a solvent that will remove the metal and concentrate it in the eluting solvent.

Additionally, as stated above, the molecular sieves can be exchanged with a different cation prior to its use in an ion exchange process. The criteria for choosing the cation are: 1) compatibility with the solution to be treated and 2) the relative ion exchange selectivities of the cation versus the metal ion to be removed. Such modifications of molecular sieves are well known in the art. For example, if the molecular sieve is synthesized in the potassium form and the stream contains sodium ions in addition to contaminant ions, the potassium ion should preferably be exchanged with sodium ions prior to using the molecular sieve to remove contaminants in order to prevent adding potassium ions to the treated stream.

In order to more fully illustrate the instant invention, the following examples are set forth. It is to be understood that the examples are only by way of illustration and are not intended as an undue limitation on the broad scope of the invention as set forth in the appended claims.

EXAMPLE 1

In a container equipped with a magnetic stirrer 2.81 g of NaOH and 1.36 g of KOH were mixed with 19.2 g of distilled water. To this solution there were added 2.06 g of $Nb_2O_5 \cdot nH_2O$ and the mixture was mixed well. In a separate container 11.0 g of $Ti(OC_3H_7)_4$ and 9.2 g of tetraethylorthosilicate were mixed well to give a clear solution. This clear solution was now added to the solution containing sodium, potassium and niobium and the resultant mixture stirred for 10 minutes. Finally, 95.6 g of distilled water was slowly added, followed by stirring for 15 minutes. The pH of this reaction mixture was 12.89. A portion of the reaction mixture (34.2 g) was placed in a reactor and heated at 200° C. for 24 hours. After this time, the mixture was vacuum filtered, the solid was washed with distilled water and dried in air.

A sample of the intergrowth product was analyzed by Transmission Electron Microscopy to obtain lattice imaging of the crystals. The lattice image of this material is presented in FIG. 4. The arrows in FIG. 4 indicate the sections of pharmacosiderite present in the intergrowth sample. The thinner sections making up the balance of the crystal in the image correspond to blocks of the sitinakite structure.

EXAMPLE 2

A sample of Example 1 was tested to determined its ability to adsorb cesium by determining its cesium distribution coefficient ($K_d$) as follows.

On hundred milligrams of the sample was placed into a 25 mL polyethylene terephthalate (PET) plastic vial. To this vial there were added 10 mL of a solution containing 5.7M $NaNO_3$, 0.6M NaOH and a 100 mg/L concentration of cesium chloride solution. The vial was capped and placed in an environmental orbital shaker maintained at 25° C. The sample was agitated for about 18 hours at 300 revolutions per minute, removed from the shaker and the powder material allowed to settle. Next the supernate was vacuum filtered with a 0.2 micron membrane filter, diluted 10:1 and then analyzed for cesium by flame atomic absorption spectroscopy.

The $K_d$ value was calculated using the following formula:

$$K_d(\mathrm{mL}/\mathrm{g}) = \frac{(V)(Ac)}{(W)(Sc)}$$

where:
V=volume of waste stimulant (mL)
Ac=concentration of cation absorbed on ion-exchanger (g/mL)
W=mass of ion-exchanger evaluated (g)
Sc=concentration of cation in post reaction supernate (g/mL)

The sample of Example 1 was found to have a cesium $K_d$ of 300. The above $K_d$ was obtained using the weight of the sample as synthesized. On an anhydrous basis, the $K_d$ was 361.

EXAMPLE 3

In a container equipped with a magnetic stirrer 0.7 g of NaOH and 0.3 g of KOH were mixed with 27.4 g of distilled water. To this solution there were added 0.5 g of $Nb_2O_5 \cdot nH_2O$ and the mixture was mixed well. In a separate container 2.62 g of $Ti(OC_3H_7)_4$ and 2.20 g of tetraethylorthosilicate were mixed well to give a clear solution. This clear solution was now added dropwise to the solution containing sodium, potassium and niobium and the resultant mixture stirred for 2 hours at room temperature. The pH of this reaction mixture was 12.06 and the mixture had the following composition:

$0.24\ K_2O: 0.71\ Na_2O: 0.15\ Nb_2O_5: 0.77\ TiO_2: 0.87\ SiO_2: 125\ H_2O$

The reaction mixture was placed in a reactor and reacted at 200° C. for 72 hours under autogenous pressure with mixing. At the end of this time period, the solid was isolated, washed with distilled water and dried in air at room temperature.

A sample of this product was analyzed by diffraction and TEM which showed that it was an intergrowth of the pharmacosiderite and sitinakite structures. A sample of this product was also tested according to the procedure of Example 2 and was found to have a $K_d$ of 350 on an anhydrous basis.

EXAMPLE 4

In a container equipped with a magnetic stirrer 6.9 g of NaOH and 3.2 g of KOH were mixed with 50.2 g of distilled water. To this solution there were added 3.3 g of $Nb_2O_5 \cdot nH_2O$ and the mixture was mixed well. In a separate container 17.5 g of $Ti(OC_3H_7)_4$ and 14.5 g of tetraethylorthosilicate were mixed well to give a clear solution. This clear solution was now added dropwise to the solution containing sodium, potassium and niobium and the resultant mixture stirred for 20 minutes. Next 132.7 g of distilled water was added followed by the dropwise addition of 16.2 g of a 50% KOH solution and finally the dropwise addition of 35.64 g of a 50% NaOH solution. The pH of this reaction mixture was 13.4 and the mixture had the following composition:

$1.26\ K_2O: 3.85\ Na_2O: 0.15\ Nb_2O_5: 0.77\ TiO_2: 0.87\ SiO_2: 140\ H_2O$

One portion of the above mixture was reacted at 200° C. for 120 hours (Sample A) while a second portion was reacted at 170° C. for 72 hours (Sample B) under autogenous pressure. After this time, both products were isolated, washed with distilled water and dried in air at room temperature.

Portions of samples A and B were analyzed by x-ray diffraction which showed that each was an intergrowth of the pharmacosiderite and sitinakite structures. Portions of Samples A and B were tested for cesium adsorption per Example 2 and were found to have the following $K_d$ on an anhydrous basis:

Sample A $K_d$=353
Sample B $K_d$=289

EXAMPLE 5

In a container equipped with a magnetic stirrer 8.58 g of NaOH and 4.01 g of KOH were mixed with 342.4 g of distilled water. To this solution there were added 6.22 g of $Nb_2O_5 \cdot nH_2O$ and the mixture was mixed well. In a separate container 33.0 g of $Ti(OC_3H_7)_4$ and 27.0 g of tetraethylorthosilicate were mixed well to give a clear solution. This clear solution was now added dropwise to the solution containing sodium, potassium and niobium and the resultant mixture stirred. The pH of this reaction mixture was 11.96 and the mixture had the following composition:

$0.24\ K_2O: 0.71\ Na_2O: 0.15\ Nb_2O_5: 0.77\ TiO_2: 0.87\ SiO_2: 125\ H_2O$

The mixture was placed into an 0.6 liter Parr Stirred Reactor and reacted at 200° C. for 72 hours with stirring at 150–200 RPM under autogenous pressure. After this time, the solid was isolated, washed with distilled water and dried in air at room temperature.

A portion of this product was analyzed by x-ray diffraction which showed that it was an intergrowth of the pharmacosiderite and sitinakite structures. Elemental analysis gave the following empirical formula:

$0.33\ K_2O: 0.67\ Na_2O: 0.28\ Nb_2O_5: 1.61\ TiO_2: 1.0\ SiO_2: 3.83\ H_2O$

Another portion of this product was tested for Cs adsorption per Example 2 and was found to have a $K_d$ of 454 on an anhydrous basis.

I claim as my invention:

1. A crystalline molecular sieve having a chemical composition represented by the empirical formula:

$$A_{((4-4x)/n)}(M_xTi_{1-z}Ge_y)_4(Ge_{1-p}Si_p)_qO_r$$

where A is an exchangeable cation selected from the group consisting of alkali metals, alkaline earth metals, hydronium ion, ammonium ions, alkylammonium ions having $C_1$ or $C_2$ alkyl groups and mixtures thereof, n is the valence of A and has a value of +1 or +2, M is a metal selected from the group consisting of niobium, tantalum, antimony or mixtures thereof, x has a value from about 0.01 to about 0.99, z=x+y, y has a value from 0 to 0.75, p has a value from 0 to about 1, q has a value from about 2.01 to about 2.99 and r has a value from about 14.02 to about 15.98, the sieve characterized in that it has a crystal structure which is an intergrowth of the pharmacosiderite and sitinakite structures.

2. The molecular sieve of claim 1 where p has a value of 1.

3. The molecular sieve of claim 1 further characterized in that it has a diffraction pattern with at least one peak at a d-spacing between 7 Å and 8 Å with a relative intensity of 100.

4. The molecular sieve of claim 1 where M is niobium.

5. The molecular sieve of claim 1 where A is an alkali metal selected from the group consisting of sodium, potassium, rubidium, lithium, cesium and mixtures thereof.

6. The molecular sieve of claim 5 where A is a mixture of sodium and potassium.

7. A process for preparing a crystalline molecular sieve having a chemical composition represented by the empirical formula:

$$A_{((4-4x)/n)}(M_xTi_{1-z}Ge_y)_4(Ge_{1-p}Si_p)_qO_r$$

where A is a cation selected from the group consisting of alkali metals, alkaline earth metals, hydronium ion, ammonium ions, alkylammonium ions having $C_1$ or $C_2$ alkyl groups and mixtures thereof, n is the valence of A and has a value of +1 or +2, M is a metal selected from the group consisting of niobium, tantalum, antimony or mixtures thereof, x has a value from about 0.01 to about 0.99, z=x+y, y has a value from 0 to 0.75, p has a value from 0 to about 1, q has a value from about 2.01 to about 2.99 and r has a value from about 14.02 to about 15.98, the sieve characterized in that it has a crystal structure which is an intergrowth of the pharmacosiderite and sitinakite structures, the process comprising reacting a mixture containing reactive sources of A, M, titanium, germanium and silicon at a temperature and for a time sufficient to form the crystalline metallosilicate, the mixture having a composition expressed in terms of mole ratios of the oxides of:

$$aA_{2/n}O:bM_2O_5:cGeO_2:dTiO_2:eSiO_2:fH_2O$$

where a has a value from about 0.5 to about 4, n is the valence of A, b has a value from about 0.05 to about 1.0, c has a value from 0 to about 0.8, d has a value from about 0.25 to about 1.0, e has a value from about 0.2 to about 1.3, and f has a value from about 25 to about 300.

8. The process of claim 7 where the temperature varies from about 130° C. to about 225° C.

9. The process of claim 7 where the A source is selected from the group consisting of potassium hydroxide, cesium hydroxide, rubidium hydroxide, sodium hydroxide, potassium carbonate, sodium carbonate, cesium carbonate and rubidium carbonate.

10. The process of claim 7 where the M metal is niobium and the niobium source is niobium oxide.

11. The process of claim 7 where the titanium source is selected from the group consisting of titanium trichloride, titanium tetrachloride, titanium alkoxides and amorphous titania.

* * * * *